United States Patent Office 3,804,767
Patented Apr. 16, 1974

3,804,767
METHOD OF MANUFACTURING CERAMIC MAGNETS CONTAINING STRONTIUM OR BARIUM FERRITE
Terence Leslie Tombs, Warwick, England, assignor to Joseph Lucas (Industries) Limited, Birmingham, England
No Drawing. Continuation-in-part of abandoned application Ser. No. 88,469, Nov. 10, 1970. This application Oct. 26, 1972, Ser. No. 301,251
Claims priority, application Great Britain, Nov. 11, 1969, 55,085/69
Int. Cl. C04b 35/00
U.S. Cl. 252—62.63
18 Claims

ABSTRACT OF THE DISCLOSURE

A method of manufacturing a ceramic magnet containing strontium ferrite includes the step of first producing a particulate mixture of celestite and ferric oxide in such proportions that the composition of the strontium ferrite in the resultant magnet lies in the range $SrO5.1Fe_2O_2$ to $SrO6.0Fe_2O_3$. The particulate mixture is then heated in the presence of a reaction promoting compound at a temperature sufficient to cause the celestite and the ferric oxide to react together to directly form a product containing strontium ferrite, the reaction promoting compound being chosen so that its cation forms a sulphate which can be removed from the product by leaching. Subsequently the sulphate is removed from the product by leaching.

A magnet containing barium ferrite can also be manufactured by the present method in which case a particulate mixture of barium sulphate and ferric oxide is produced and heated in the presence of the particulate reaction promoting compound.

---

This invention relates to a method of manufacturing ceramic magnets containing strontium or barium ferrite and is a continuation-in-part of my application No. 88,469, filed Nov. 10, 1970, now abandoned.

In one aspect, the invention resides in a method of manufacturing a ceramic magnet containing strontium ferrite including the steps of producing a particulate mixture of celestite and ferric oxide in such proportions that the composition of the strontium ferrite in the resultant magnet lies in the range $SrO5.1Fe_2O_3$ to $SrO6.0Fe_2O_3$, heating the particulate mixture of celesite and ferric oxide in the presence of a particulate reaction promoting compound at a temperature sufficient to cause the celestite and the ferric oxide to react toegther to directly form a product containing strontium ferrite, the reaction promoting compound being an oxygen containing salt of a metal chosen from the group consisting of lithium, sodium and potassium whereby, during heating of said mixture to produce said product containing strontium ferrite, the salt is converted to a sulphate of the corresponding metal, which sulphate can be removed by leaching, and subsequently removing said sulphate from said product by leaching.

In a further aspect, the invention resides in a method of manufacturing a ceramic magnet containing barium ferrite including the steps of producing a particulate mixture of barium sulphate and ferric oxide in such proportions that the composition of the barium ferrite in the resultant magnet lies in the range $BaO5.1Fe_2O_3$ to $BaO6.0Fe_2O_3$, heating the particulate mixture of barium sulfate and ferric oxide in the presence of a particulate reaction promoting compound at a temperature sufficient to cause the barium sulphate and the ferric oxide to react together to directly form a product containing barium ferrite, the reaction promoting compound being an oxygen containing salt of a metal chosen from the group consisting of lithium, sodium and potassium whereby, during heating of said mixture to produce said product containing barium ferrite, the salt is converted to a sulphate of the corresponding metal, which sulphate can be removed by leaching, and subsequently removing said sulphate from said product by leaching.

The reaction between the particulate ferric oxide and the particulate celestite or barium sulphate in the presence of the particulate reaction promoting compound to directly form the ferrite-containing product is a high temperature reaction. Thus, although the reaction will proceed at temperatures of around 800° C., the reaction at such temperatures is slow. In performing the methods described above, it is therefore desirable to ensure that the reaction temperature is above 800° C. and more preferably is at least 1100°C.

In a first example of the invention wherein it is required to manufacture a magnet containing strontium ferrite, a powder mixture of 75.17% ferric oxide in hematite form, 15.75% celestite and 9.08% of anhydrous, commercial grade sodium carbonate is prepared by shaking together the powdered constituents until thoroughly blended. Desirably the particle sizes of the constituents of the mixture are chosen to be less than 50 microns, and preferably less than 10 microns. The powder mixture is then heated at 1260° C. for 1 hour, a reaction taking place between the mixed materials, the sodium carbonate acting as a reaction promoting compound, and strontium ferrite being formed as the main reaction product. The reaction believed to take place as the mixture is heated is that the reaction promoting compound, melts and fluxes the strontium sulphate to promote the overall reaction to form the strontium ferrite. In the above example using sodium carbonate as the reaction promoting compound the overall reaction is:

$2SrSo_4 + 2Na_2CO_3 + 11Fe_2O_3$ 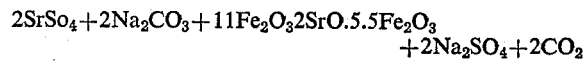
$+ 2Na_2SO_4 + 2CO_2$

The reaction product is in the form of a clinker and so is then crushed, ground and wet ball milled to a fine powder. The water soluble impurities, for example sodium salts, are removed after the ball milling operation by leaching.

For the manufacture of anisotropic magnets the slurry from the wet ball milling operation is filter pressed in a die in a magnetic field of 7000 oersteds, to orient the particles in the slurry, and at a final pressure of 6500 p.s.i. The pressed material, after demagnetization, is then removed from the die and thoroughly dried. The material is then heated slowly to a sintering temperature of 1200° C. and after sintering and subsequent cooling a dense ferrite magnet is obtained, the heating and cooling rates being maintained at less than 100° C./hour. A typical ferrite magnet in accordance with the above example of the invention has the following properties:

Density=4.60 g./cc.
Remanence=3665 gauss
Intrinsic coercivity=4245 oersteds
Normal coercivity=3450 oersteds In a modification of the first example of the invention a mixture of the same ratios of hematite, celestite and anhydrous sodium carbonate as indicated in the above example is made by agitation of an aqueous suspension of the respective powders. The slurry so formed is dried by evaporation and the resulting particulate mixture is heated at 1260° C. for one hour. Formation of anisotropic magnet then follows the same steps as indicated in the first example, the sintering of the pressed material at 1290° C. producing a ferrite magnet having the following properties:

Density=4.82 gm./cc.
Remanence=4100 gauss
Intrinsic coercivity=3050 oersteds

In the above modification, wherein the hematite, celestite and sodium carbonate are mixed by agitation of aqueous suspension of the respective powders, it is found that drying of the slurry so formed can result in some segregation of the constituents as well as loss of the soluble sodium carbonate and hence the dry mixing method is preferred.

In the above example, the relative proportions of the constituents of the particulate mixture used to form the strontium ferrite containing material are such that the composition of the material is $SrO_5.5Fe_2O_3$. Although this composition is preferred, strontinum ferrite compositions within the range $SrO5.1Fe_2O_3$ to $SrO6.0Fe_2O_3$ are found to produce satisfactory ceramic magnets. By way of example, a mixture containing 76.79% hematite, 14.72% strontinum sulphate in the form of a celestite and 8.49% sodium carbonate produced on sintering a strontium ferrite material having the composition $SrO_6.0Fe_2O_3$, whereas a material having the composition $SrO5.1Fe_2O_3$ was produced by sintering a mixture of 73.76% hematite, 16.64% strontium sulphate in the form of celestite and 9.60% sodium carbonate.

It is to be appreciated that compounds other than sodium carbonate can act as the reaction promoting compound in the formation of the strontium ferrite. Suitable compounds are those which possess a higher free energy of formation than the corresponding strontinum salt of the same anion and whose anions are oxygen containing. Further to allow separation of the strontium ferrite from the reaction products it is essential that the reaction promoting compound is chosen so that its cation forms a sulphate which can be removed from the reaction products by leaching preferably with water. Thus, by way of example, other suitable compounds include potassium carbonate, sodium nitrate, sodium oxalate and lithium carbonate. Further, it will be appreciated that celestite comprises mainly strontium sulphate, the material used in the above example being that available as celestite are and having an approximate composition of $SrSO_4$, 93–94%; $BaSO_4$, 1.75%; $CaSO_4$, 0.1%; $CaCO_3$, 0.2%; $Fe_2O_3$, 0.65%; $Al_2O_3$, 0.65%, and SiO, 1.0%.

In a second example of the invention wherein a magnet containing barium ferrite is to be produced, a powder mixture of 72.13% hematite, 19.17% barium sulphate in the form of barytes and 8.70% of anhydrous, commercial grade sodium carbonate was prepared by dry mixing the powdered constituents in a blender, the particle sizes of the constituents being desirably less than 50 microns, and preferably less than 10 microns. The particulate mixture was then sintered at 1260° for 1 hour during which a reaction occurred to give a final product containing barium ferrite and sodium sulphate. The sintered product was ball milled in water to a powder of particle size of about 1 micron and the water soluble impurities, mainly sodium sulphate, were removed by a successive washing and decanting operations.

Anisotropic magnets were produced by filter pressing the ball milled barium ferrite slurry in a die in a magnetic field of 7000 oersteds to orient the particles. A final pressure of 6500 p.s.i. was maintained in the die while the material was demagnetized prior to removal from the die. The material was thoroughly dried and then sintered at 1251° C. whereby on cooling a dense ferrite magnet was obtained, the heating and cooling rates of the sintering operation being maintained below 100° C./hour. The magnet produced by the above example exhibited the following properties:

Density=4.75 gms./cc.
Remanence=3940 gauss
Intrinsic coercivity=3700 oersteds
Normal coercivity=3600 oersteds The barium ferrite material produced in the above example was found to have a composition of $Ba-5.5Fe_2O_3$, which is the preferred composition although compositions within the range $BaO5.1Fe_2O_3$ to $BaO6.0Fe_2O_3$ were found to produce satisfactory magnets. A barium ferrite material having the compositions $BaO6.0Fe_2O_3$ was produced by sintering a mixture of 73.84% hematite, 17.99% barium sulphate and 8.17% sodium carbonate, whereas sintering a mixture of 70.58 hematite 20.23% barium sulphate and 9.19% sodium carbonate produced a barium ferrite composition of $BaO5.1Fe_2O_3$.

It is to be appreciated, that as in the first example of the invention relating to strontium ferrite contains magnets, the reaction promoting compound may be other than sodium carbonate and, by way of example, other suitable compounds are potassium carbonate, sodium nitrate, sodium oxalate and lithium carbonate.

Also it is to be appreciated that both isotropic and anisotropic dry pressed magnets containing strontium or barium ferrite can be produced by this method as well as the wet pressure magnets produced in the example. Further orientation of the particles in the slurry used in the wet pressing process can be carried out in magnetic seals other than 7000 oersteds, although below 3000 oersteds only partial orientation of the particles is achieved. Finally, it is to be appreciated that the temperature used to sinter the ferrite material into the final magnet can be varied from the values cited above, although the preferred temperature is above 1100° C.

Having thus described my invention what I claim as new and desire to secure by Letters Patent is:

1. A method of manufacturing a ceramic magnet containing strontium ferrite, including the steps of producing a particulate mixture of celestite and ferric oxide in such proportions that the composition of the strontium ferrite in the resultant magnet lies in the range $SrO5.1Fe_2O_3$ to $SrO6.0Fe_2O_3$, heating the particulate mixture of celestite and ferric oxide in the presence of a particulate reaction promoting compound at a temperature sufficient to cause the celestite and the ferric oxide to react together to directly form a product containing strontium ferrite, the reaction promoting compound being an oxygen containing salt of a metal chosen from the group consisting of lithium, sodium and potassium whereby, during heating of said mixture to produce said product containing strontium ferrite, the salt is converted to a sulphate of the corresponding metal, which sulphate can be removed by leaching, and subsequently removing said sulphate from said product by leaching.

2. A method as claimed in claim 1 wherein the proportions of celestite and ferric oxide in the particulate mixture are arranged to be such that the composition of the strontium ferrite in the resultant magnet is $SrO5.5Fe_2O_3$.

3. A method as claimed in claim 1 wherein said temperature is in excess of 800° C.

4. A method as claimed in claim 1 wherein said temperature is at least 1100° C.

5. A method as claimed in claim 1 wheerin the reaction promoting compound comprises one of the group consisting of sodium carbonate, sodium oxalate, sodium nitrate, potassium carbonate, and lithium carbonate.

6. A method as claimed in claim 1 wherein the reaction promoting compound is sodium carbonate.

7. A method as claimed in claim 1 wherein the constituents of said mixture and said reaction promoting compound are in the form of particles having a particle size of less than 50 microns.

8. A method as claimed in claim 1 wherein the constituents of said mixture and reaction promoting compound are in the form of particles having a particle size of less than 10 microns.

9. A method as claimed in claim 1 wherein the ferric oxide is present in the mixture in the form of hematite.

10. A method of manufacturing a ceramic magnet containing barium ferrite including the steps of producing a particulate mixture of barium sulphate and ferric oxide in such proportions that the composition of the barium ferrite in the resultant magnet lies in the range $BaO5.1Fe_2O_3$ to $BaO6.0Fe_2O_3$, heating the particulate mixture of barium sulphate and ferric oxide in the presence of a particulate reaction promoting compound at a temperature sufficient to cause the barium sulphate and the ferric oxide to react together to directly form a product containing barium ferrite, the reaction promoting compound being an oxygen containing salt of a metal chosen from the group consisting of lithium, sodium and potassium whereby, during heating of said mixture to produce said product containing barium ferrite, the salt is converted to a sulphate of the corresponding metal, which sulphate can be removed by leaching, and subsequently removing said sulphate from said product by leaching.

11. A method as claimed in claim 10 wherein the proportions of barium sulphate and ferric oxide in the mixture are arranged to be such that the composition of the barium ferrite in the magnet is $BaO5.5Fe_2O_3$.

12. A method as claimed in claim 10 wherein said temperature is in excess of 800° C.

13. A method as claimed in claim 10 wherein said temperature is at least 1100° C.

14. A method as claimed in claim 10 wherein the reaction promoting compound comprises one of the group consisting of sodium carbonate, sodium oxalate, sodium nitrate, potassium carbonate, and lithium carbonate.

15. A method as claimed in claim 10 wherein the reaction promoting compound is sodium carbonate.

16. A method as claimed in claim 10 wherein the constituents of said mixture and said reaction promoting compound are in the form of particles having a particle size of less than 50 microns.

17. A method as claimed in claim 10 wherein the constituents of said mixture and said reaction promoting compound are in the form of particles having the particle size of less than 10 microns.

18. A method as claimed in claim 10 wherein the barium sulphate is in the form of barytes.

References Cited
UNITED STATES PATENTS

| | | | |
|---|---|---|---|
| 3,113,927 | 12/1963 | Cochardt | 252—62.63 |
| 3,337,461 | 8/1967 | Cochardt | 252—62.63 X |
| 3,380,920 | 4/1968 | Cochardt | 252—62.63 |
| 3,597,357 | 8/1971 | Cochardt | 252—62.63 |

OSCAR R. VERTIZ, Primary Examiner

J. COOPER, Assistant Examiner

U.S. Cl. X.R.
423—594